W. G. McCONNACHIE.
DRAFT EQUALIZER.
APPLICATION FILED MAY 18, 1910.
1,044,556.
Patented Nov. 19, 1912.
2 SHEETS—SHEET 1.
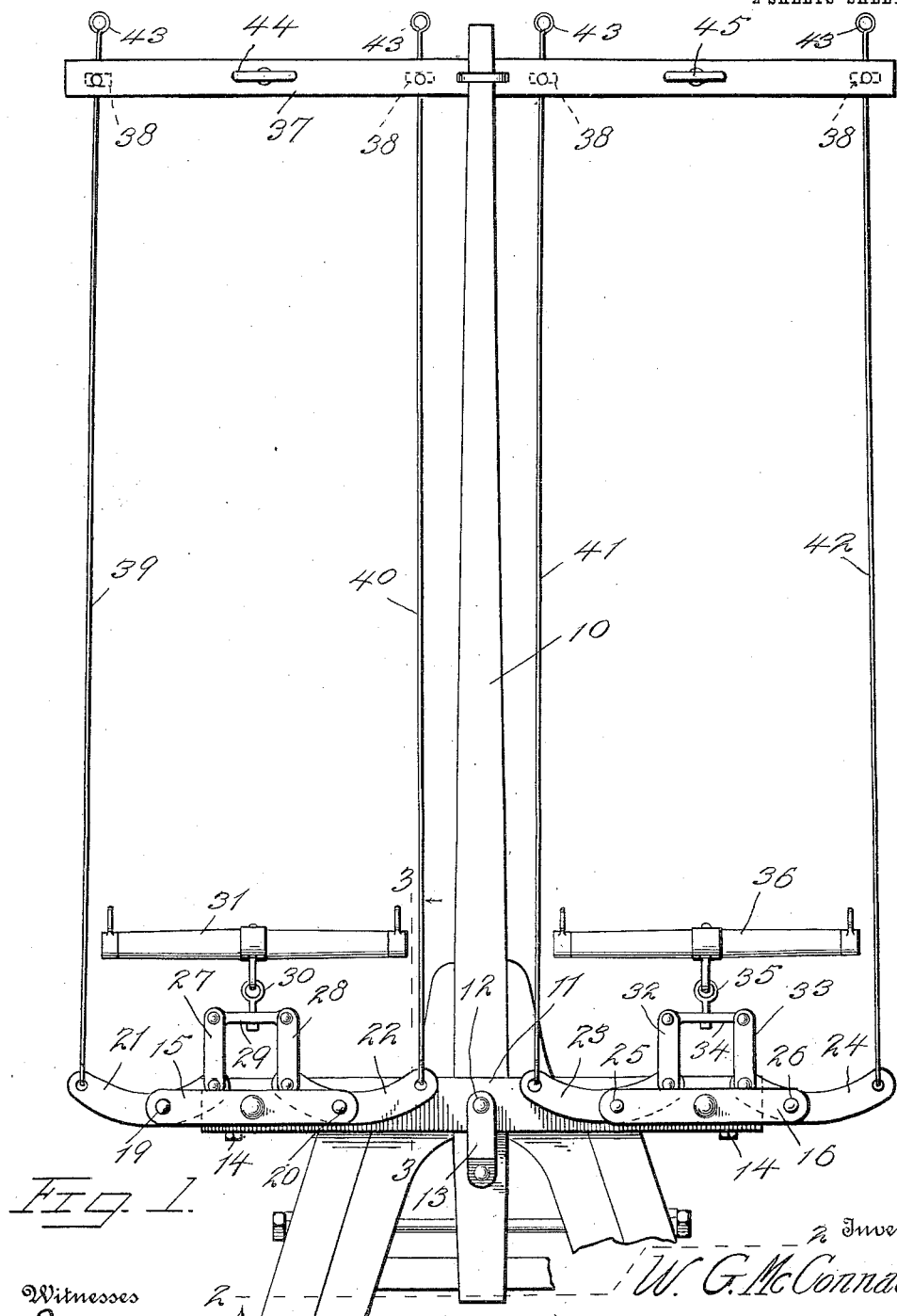

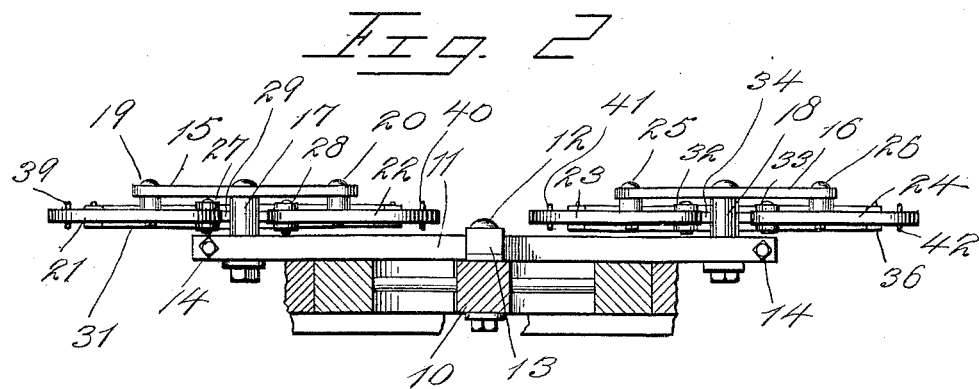
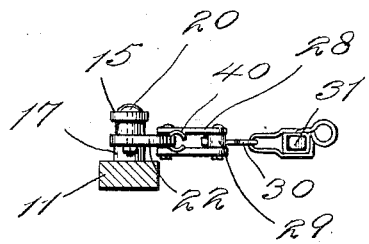

UNITED STATES PATENT OFFICE.

WILLIAM G. McCONNACHIE, OF MEDFORD, NORTH DAKOTA.

DRAFT-EQUALIZER.

1,044,556.

Specification of Letters Patent.   Patented Nov. 19, 1912.

Application filed May 18, 1910.  Serial No. 562,066.

*To all whom it may concern:*

Be it known that I, WILLIAM G. McCONNACHIE, a citizen of the United States, residing at Medford, in the county of Walsh, State of North Dakota, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, more particularly to devices of this character adapted for four horses, and has for one of its objects to improve the construction and increase the efficiency and utility of devices of this character.

With this and other objects in view, the invention consists in certain novel features of construction as hereafter shown and described and then specifically pointed out in the claim, and in the drawings illustrative of the preferred embodiment of the invention, Figure 1 is a plan view of the improved device. Fig. 2 is a rear elevation of the same. Fig. 3 is a section on the line 3—3 of Fig. 1, showing the relative arrangement of one of the rear swingle trees and one of the equalizing bars.

The improved device may be employed in connection with any of the various vehicles or agricultural machines upon which four horses are required, and it is not desired therefore to limit the invention to any specific mechanism with which it may be associated.

The improved device is employed in connection with an ordinary draft tongue, and for the purpose of illustration a conventional tongue is represented at 10. Bearing over the draft tongue near its rear end is a main evener beam 11, the beam being pivotally connected at 12 to the tongue and supported by a keeper 13 of the usual form.

At its terminals the beam 11 is provided with transverse rivets 14 to prevent the splitting of the beam under the strains to which it will be subjected when in use. Mounted to swing upon the main beam 11 at its ends are smaller supplemental evener beams 15—16. The main evener beam 11 is provided at its ends with spacing blocks 17—18 upon which the smaller beams 15—16 swing, so that the smaller beams are supported a considerable distance above the upper surface of the main evener beam 11, the object to be hereafter explained.

Swinging at 19—20 from the under sides of the supplemental beam at its ends are equalizer bars 21—22, while similar evener bars 23—24 are mounted to swing at 25—26 in the same manner from the supplemental beam 16. The inner ends of the members 21—22 are provided with links 27—28, and coupled to these links at their free ends is a rod 29 having an eye 30 centrally thereof to which a swingle-tree 31 of the usual form is connected. Connected to the inner ends of the bars 23—24 are similar links 32—33, the latter coupled by a rod 34 having an eye 35 to which the swingle tree 36 is coupled. Mounted to swing upon the tongue 12 at its outer free end is a yoke member 37 having eyes 38 spaced apart and depending therefrom, two of the eyes being located adjacent to the tongue and the remaining eyes located near the outer ends of the member 37, as shown. Draft cables 39—40 are connected to the outer ends of the members 21—22 and extend thence through two of the eyes 38, while similar draft cables 41—42 are connected to the outer ends of the members 23—24 and lead thence through two of the eyes 38. The free ends of the various rods 39—40—41—42 are provided with eyes 43 to which the traces of the forward horses are coupled, while the rear horses are coupled by their traces to the swingle trees 31—36. By this means the rear horses travel at opposite sides of the tongue 10 and between the rods 39—40 and 41—42, while the forward horses travel side by side and in advance of the yoke member 37. The rear horses thus pull against the inner terminals of the members 21—22 and 23—24, while the forward horses pull against the outer ends of the same members. The members 39—40—41—42 may be constructed of any suitable material, but will preferably be of wire rope, but it is not desired to limit the invention to any specific material for this portion of the device.

The members 21—22 and the members 23—24 are slightly longer externally of the pivots 19—20 and 25—26, so that the pull is equalized between the horses. By this means each horse pulls his own share of the load, and does not pull any more. By this arrangement the rear horses are relieved from the weight of the swingle trees employed in connection with the draft appliances of the forward horses, as the draft appliances of the forward horses, by this arrangement, are arranged rearwardly of the rear horses, and all of the draft appliances are borne by the relatively large evener beam 11.

The members 11—37 are preferably of wood, while the remaining portions of the device are preferably of metal, and will be constructed as light as possible consistent with the strains to which they will be subjected.

The improved device is simple in construction, can be inexpensively manufactured, and applied in all localities where devices of this character are required.

The yoke member 37 serves the two fold purpose as a spacer member to maintain the draft cables 39—40—41—42 uniformly spaced and at the same time serves as a yoke to which the collar or hame portions of the harnesses of the rear horses are coupled, and to this end the member 37 is provided with rings 44—45 to receive the hame or collar straps.

What is claimed is:—

In a draft equalizer the combination with a draft tongue, and a main evener beam pivoted thereon, of a supplemental evener beam pivoted on the main beam adjacent to each end of the latter, a pair of equalizer bars pivoted at their center to the ends of each supplemental evener beam, a link pivoted to the inner end of each equalizer bar, a cross rod pivotally connecting the outer free end of adjacent links, a swingle tree connected to each cross rod, and a draft line connected to the outer end of each of the equalizer bars and running forward beyond the swingle trees, the construction and arrangement being such that a pair of draft animals may be hitched in tandem at each side of the pole, the rear draft animals being connected to the swingle trees while the forward draft animals are connected to the draft lines.

In testimony whereof, I affix my signature, in presence of two witnesses.

WILLIAM G. McCONNACHIE.

Witnesses:
JAMES COOPER,
M. L. DRYBURGH.

---

Copies of this patent may be obtained for five cents each, by addressing the "Commissioner of Patents, Washington, D. C."